March 18, 1941. C. H. MERCER 2,235,530
SECURING MEANS
Filed March 11, 1939
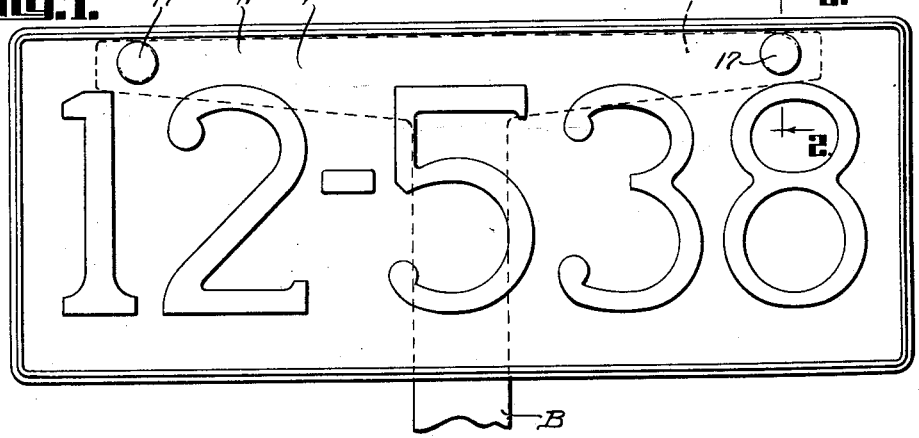
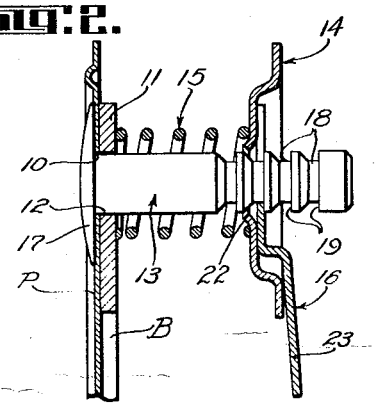
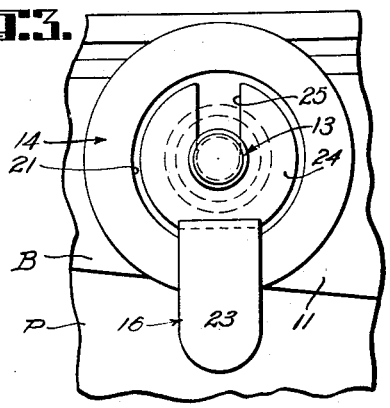
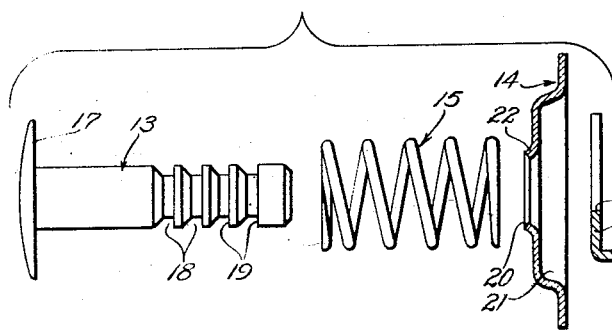
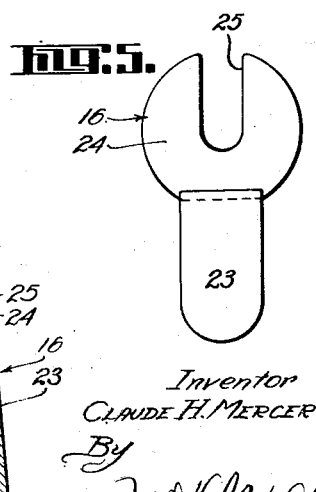
Inventor
CLAUDE H. MERCER
By
His Attorney Patented Mar. 18, 1941

2,235,530

UNITED STATES PATENT OFFICE 2,235,530

SECURING MEANS

Claude H. Mercer, Whittier, Calif.

Application March 11, 1939, Serial No. 261,246

4 Claims. (Cl. 85—8)

This invention relates to attaching means and securing means and relates more particularly to means for securing automobile license plates to their supporting brackets. A general object of the invention is to provide a simple, practical and inexpensive securing means of the character referred to that provides for the easy and rapid attachment and detachment of the license plates.

Another object of this invention is to provide a securing means for attaching automobile license plates to their supporting brackets that securely and dependably hold the plates in place.

Another object of this invention is to provide a securing means of the character referred to that prevents vibration and rattling of the plates.

Another object of this invention is to provide attaching or securing means of the character mentioned that may be easily and quickly assembled and installed without employing tools.

Another object of this invention is to provide securing means of the character mentioned that may be easily and quickly removed after the plates have been in use for a prolonged period and may be re-employed to secure new plates to the supporting brackets.

A further object of this invention is to provide attaching or securing means of the character referred to that are small and inconspicuous and that embody a minimum number of simple, inexpensive parts.

The various objects and features of my invention will be fully understood from the following detailed description of a typical preferred form and application of the invention, throughout which description reference is made to the accompanying drawing, in which:

Fig. 1 is a front elevation of a typical automobile license plate secured to its supporting bracket by the securing means of the invention. Fig. 2 is an enlarged fragmentary vertical detailed sectional view taken as indicated by line 2—2 on Fig. 1 and illustrating one of the attaching means. Fig. 3 is an enlarged fragmentary rear elevation of the structure illustrated in Fig. 1. Fig. 4 is a side view of the attaching means illustrated in Fig. 2 with the parts separated and illustrating the washer and keeper in vertical cross section, and Fig. 5 is a rear elevation of the keeper.

The securing means of the present invention may be employed in various situations and have many uses. I have herein made reference to the invention as means for securing automobile license plates in place, and will describe the invention in connection with the securing of a typical license plate to its bracket. It is to be understood, however, that the invention is not to be taken as limited or restricted to the specific form and application of the invention herein described, but is to be taken as including any features or modifications that may fall within the scope of the claims.

The license plate P illustrated in the drawing is of typical design and construction and is provided adjacent its upper edge with horizontally spaced openings 10 to receive attaching means. The license plate supporting bracket B illustrated in the drawing is an upright element of T shape having two lateral arms 11 at its upper end. The plate P is arranged against the forward faces of the arms 11 and the arms have slots or openings 12 for registering with the openings 10 in the plate P. A securing means of the invention is provided at each set of registering openings 10 and 12 to secure the plate P to the bracket arms 11. The two securing means or assemblies may be identical and I will proceed with a description of one securing means of the invention, it being understood that such description is equally applicable to the other securing means.

The attaching or securing means of the invention may be said to comprise, generally, a shouldered pin 13 to be arranged through a set of registering openings 10 and 12 in the plate P and a bracket arm 11, a washer 14 to be arranged on the pin 13, a spring 15 engaged under compression between the washer 14 and a bracket arm 11, and a keeper 16 to be removably locked on the shouldered pin 13 in a position against the washer 14 where it holds the spring 15 under compression.

The pin 13 is an elongate part provided at its outer end with a head 17. The outer side of the head 17 is convex and rounded while the inner side of the head is flat to engage rearwardly against the forward face of the license plate P. The body of the pin 13 is proportioned to pass through the openings 10 and 12 with suitable clearance and is of sufficient length to project some distance rearwardly beyond the bracket arm 11. A multiplicity of longitudinally spaced circumferential grooves 18 is provided in the projected rear portion of the pin 13. The series of grooves 18 is preferably adjacent the rear end of the pin 13. The grooves 18 are of the same size and shape and are equally spaced along the pin 13. The rear walls of the grooves 18 are flat and lie in planes at right angles to the longitudinal axis of the pin 13 to form abrupt forwardly facing shoulders 19. The forward walls of the grooves 18 may be tapered or sloping, as illustrated.

The washer 14 is a disc-shaped part to be arranged on the grooved rear portion of the pin 13. A central opening 20 is provided in the washer 14 to freely pass the pin 13. The major portion of the washer 14 is depressed to provide the washer with a rearwardly facing central socket 21. The wall of the washer 14 immediately surrounding the opening 20 is further depressed to provide a crown or rim 22 on the forward face of the washer. The rim 22 slopes or curves forwardly and inwardly. It will be observed that the washer 14 is a simple, inexpensive, one-piece member.

The spring 15 is provided to urge the head 17 of the pin 13 rearwardly against the plate P to maintain the plate in firm engagement with the bracket arm 11. The spring 15 surrounds the body portion of the pin 13 and is arranged under compression between the rear face of the bracket arm 11 and the washer 14. In practice the spring 15 may be a simple, helical, compression spring. In the preferred construction the spring 15 surrounds the body of the pin 13 with substantial clearance. The crown or rim 22 of the washer 14 enters or extends into the rear end of the spring 15. The engagement of the rear convolution of the spring 15 with the rim 22 holds the spring 11 centralized and in concentric relation with the pin 13. The cooperation of the rear convolution of the spring 15 with the rim 22 also serves to hold the washer 14 centralized with respect to the pin 13 so that the wall of its opening 22 clears the pin and its grooves 18.

The keeper 16 is adapted to cooperate with a selected groove 18 to hold the washer 14 against rearward movement in a position where the spring 15 is under the desired compression. The keeper 16 includes a handle 23 and a head 24 on the inner end of the handle. The head 24 is a flat substantially disc-shaped part and is forked, being provided with a slot 25. The slot 25 is longitudinally aligned with the handle 23 and is radial with respect to the disc-shaped head 24. The keeper head 24 is adapted to be received in the socket 21 of the washer 14 and the handle 23 is adapted to project outwardly from the periphery of the washer when the keeper is in place. The handle 23 is offset laterally or rearwardly from the head 24 so that it may lie against or adjacent the peripheral portion of the washer 14 when the head 24 is in position against the bottom of the socket 23. The notch or slot 25 in the keeper 16 is adapted to cooperate with any one of the grooves 18, that is, it is adapted to receive the reduced portion of the pin 13 occurring at a selected groove 18.

The keeper 16 may be constructed of sheet metal, or the like, and the opposite sides or faces of the head 24 are preferably flat. The forward face of the head 24 is adapted to flatly engage against the bottom of the socket 21 while the rear face of the head is adapted to cooperate with one of the shoulders 19 on the pin 13. The engagement of the keeper head 24 with the washer 14 and a shoulder 19 dependably holds or locks the washer 14 against outward or rearward movement and the spring 15 acting rearwardly against the washer 14 assists in holding the washer in place and urges the pin 13 rearwardly so that its head 17 is firmly held against the plate P.

It is preferred to construct the several parts of the securing means of a material that is resistant to corrosion or rust or to treat or plate the parts so that they will not rust. In practice the pin 13, the washer 14, the spring 15 and the keeper 16 may be cadmium plated to be rust resistant.

In attaching the plate P to the bracket B the plate is arranged in a position where its openings 10 are in registration with the openings 12 in the bracket arms 11 and a pin 13 is passed rearwardly through one set of registering openings 10 and 12 to have its head 17 engage against the face of the plate P. The spring 15 is then arranged on the pin 13 to engage against the rear face of the bracket arm 11. The washer 14 is slipped over the projecting rear portion of the pin 13 to engage against the rear end of the spring 15. The washer 14 is pressed forwardly to put the spring 15 under some compression and the keeper 16 is then arranged in place to have its head 24 in the socket 21 and to have its slot 25 in cooperation with a groove 18. The keeper 16 is arranged in place while the washer 14 is held forwardly so that the engagement of the keeper head 24 with a shoulder 19 locks or secures the washer in a position where the spring 15 is under the desired compression. It will be apparent how the keeper 16 may be easily slipped into place to have its slot 25 in cooperation with a selected groove 18. This completes the assembly of one of the securing means. The other securing means for attaching the plate P to the bracket B may be assembled in the same manner.

The spring 15 arranged under compression between the bracket arm 11 and the forward side of the washer 14 acts rearwardly on the washer 14 and this spring pressure is transmitted from the washer to the pin 13 by the keeper head 24. Thus the spring 15 acts rearwardly on the pin 13 through the medium of the washer 14 and the keeper 16 and the head 17 of the pin is pressed rearwardly against the face of the plate P to hold the plate firmly against the bracket arm 11. The spring urged attaching pin 13 of the improved securing means dependably holds the plate 11 against vibration and rattling. The spring 15 acts rearwardly against the washer 14 with sufficient force to hold the keeper head 24 tightly gripped between the wall of the socket 21 and one of the pin shoulders 19 so that the keeper is held against displacement. The socket 21 receives and confines the head 24 to assist in retaining the keeper 16 in place.

When it is desired to remove the plate P from the bracket B the washers 14 of the two securing means are pressed forwardly to free the keepers 16 for easy removal. Upon removal of the keepers 16 the washers 14 and the springs 15 are readily slid from the pins 13 and the pins may be removed from the openings 10 and 12. It is to be noted that the securing means provided by the present invention may be assembled and put into use without employing tools and may be released and taken apart in a similar manner. The securing means embody simple, inexpensive parts and are inconspicuous. When the plate P is secured to the bracket B by the securing means described above, the pin heads 17 are the only parts of the securing means that are visible at the front of the plate P.

Having described only a typical perferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. Means for securing a plate to a support, the plate and support having registering openings, said means including a pin to be passed through said openings to project from the rear side of the support, a head on the pin to engage the face of the plate, the projecting rear portion of the pin having longitudinally spaced circumferential grooves, a washer to be arranged on the projecting rear portion of the pin, a coiled spring to be arranged on the pin between the washer and the rear side of the support, and a keeper to be removably engaged in any one of the grooves to lock the washer against rearward movement in a position where the spring is under compression to urge the head rearwardly against the plate.

2. Means for securing a plate to a support, the plate and support having registering openings, said means including a pin to be passed through said openings to project from the rear side of the support, a head on the pin to engage the face of the plate, the projecting rear portion of the pin having longitudinally spaced circumferential grooves, a washer to be arranged on the projecting rear portion of the pin, the washer having a socket in its rear side, a coiled spring to be arranged on the pin between the washer and the rear side of the support, and a keeper including a forked head to be seated in said socket to cooperate with a groove in the pin to lock the washer in a position where the spring is under compression to hold the said head firmly against the plate.

3. Means for securing a plate to a support, the plate and support having registering openings, said means including a pin to be passed through said openings to project from the rear side of the support, a head on the pin to engage the face of the plate, the projecting rear portion of the pin having a plurality of longitudinally spaced circumferential grooves, a washer to be arranged on the projecting rear portion of the pin, a coiled spring to be arranged on the pin between the washer and the support, and a keeper for releasably locking the washer on the pin in a position where the spring is under compression to hold said head firmly against the plate, the keeper including a forked head for cooperating with a selected groove in the pin, and a handle on the head.

4. Means for securing a plate to a support, the plate and support having registering openings, said means including a pin to be passed through said openings to project from the rear side of the support, a head on the pin to engage the face of the plate, the projecting rear portion of the pin having longitudinally spaced circumferential grooves, a washer to be arranged on the projecting rear portion of the pin, the washer having a socket in its rear side, a coiled spring to be arranged on the pin between the washer and the rear side of the support, a ridge on the forward side of the washer extending into the spring to center the same, and a keeper to releasably lock the washer in a position where the spring is under compression to hold the head firmly against the plate, the keeper comprising a forked head to be seated in the socket to cooperate with the grooves.

CLAUDE H. MERCER.